(12) United States Patent
Aoki

(10) Patent No.: US 12,466,510 B2
(45) Date of Patent: Nov. 11, 2025

(54) FRONT FORK

(71) Applicant: Hitachi Astemo, Ltd., Hitachinaka (JP)

(72) Inventor: Yasuhiro Aoki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 823 days.

(21) Appl. No.: 17/694,066

(22) Filed: Mar. 14, 2022

(65) Prior Publication Data

US 2022/0204117 A1 Jun. 30, 2022

Related U.S. Application Data

(63) Continuation of application No. PCT/JP2020/022374, filed on Jun. 5, 2020.

(51) Int. Cl.
*B62K 21/02* (2006.01)
*B62K 21/14* (2006.01)

(52) U.S. Cl.
CPC .............. *B62K 21/02* (2013.01); *B62K 21/14* (2013.01)

(58) Field of Classification Search
CPC ...................................................... B62K 25/08
See application file for complete search history.

(56) References Cited

U.S. PATENT DOCUMENTS

| | | | | |
|---|---|---|---|---|
| 4,438,909 A | * | 3/1984 | Matsumoto | B62K 25/08 188/287 |
| 4,881,750 A | * | 11/1989 | Hartmann | B62K 21/20 188/269 |
| 7,290,643 B2 | * | 11/2007 | Fujita | B62K 25/08 188/313 |
| 8,801,021 B2 | * | 8/2014 | Aoki | F16F 9/0236 280/276 |
| 8,919,505 B2 | * | 12/2014 | Slusarczyk | F16F 9/512 188/322.18 |

(Continued)

FOREIGN PATENT DOCUMENTS

| | | | |
|---|---|---|---|
| JP | 2009156419 A | * | 7/2009 |
| JP | 2014240664 A | | 12/2014 |
| JP | 2017180733 A | * | 10/2017 |

OTHER PUBLICATIONS

International Search Report mailed Jul. 21, 2020 for the corresponding International Application No. PCT/JP2020/022374, 5 pages [English translation attached].

(Continued)

*Primary Examiner* — Valentin Neacsu
*Assistant Examiner* — Hosam Shabara
(74) *Attorney, Agent, or Firm* — Leason Ellis LLP; Edward J. Ellis; Melvin C. Garner

(57) ABSTRACT

A front fork includes a spring that is provided between a first cylindrical body and a second cylindrical body and applies a force in a direction to separate the first cylindrical body and the second cylindrical body, and a spring seat portion that is provided on an outer peripheral surface of the first cylindrical body and receives a first end of the spring. The spring seat portion includes a fixing portion that is fixed to the first cylindrical body, a spring seat body that is made of metal and receives the spring, and a third cylindrical body that is disposed between an inner peripheral surface of the spring seat body and the outer peripheral surface of the first cylindrical body and reduces a frictional force when the spring seat body rotates.

2 Claims, 5 Drawing Sheets

(56) References Cited

U.S. PATENT DOCUMENTS

| | | | |
|---|---|---|---|
| 9,821,877 B2* | 11/2017 | Tsai | F16F 9/43 |
| 11,352,095 B2* | 6/2022 | Aoki | F16F 9/58 |
| 11,760,147 B2* | 9/2023 | Aoki | F16F 9/3214 |
| | | | 188/297 |
| 12,065,212 B2* | 8/2024 | Morishita | B62K 25/08 |
| 2014/0252706 A1 | 9/2014 | Kamioka | |
| 2023/0213083 A1* | 7/2023 | Kimura | B29C 45/261 |
| | | | 188/322.19 |

OTHER PUBLICATIONS

International Written Opinion mailed Jul. 21, 2020 for the corresponding International Patent Application No. PCT.JP2020/022374, 3 pages.

* cited by examiner

FRONT FORK

CROSS-REFERENCE TO RELATED APPLICATION

This application is a Continuation of International Application No. PCT/JP2020/022374 filed on Jun. 5, 2020, the content of which is incorporated herein by reference in its entirety.

FIELD OF THE INVENTION

The present invention relates to a front fork provided at a front portion of a saddle-ride type vehicle and attenuating vibration energy or the like.

BACKGROUND OF THE INVENTION

Part of energy such as vibration received from a road surface or the like while a saddle-ride type vehicle such as a motorcycle or a tricycle is running is attenuated by a front fork that supports a front wheel. As a related art relating to the front fork, there is a technique disclosed in JP-A-2009-156419.

As described in JP-A-2009-156419, a hydraulic shock absorber is provided with a coil spring inside. The coil spring is supported by a spring receiver.

According to the hydraulic shock absorber, an upper end of the coil spring is allowed to twist and rotate by rotation of the spring receiver.

CITATION LIST

Patent Literature

Patent Literature 1: JP-A-2009-156419

Technical Problem

Generally, while a saddle-ride type vehicle is running, the front fork receives a lateral load (a force in a direction intersecting an axial direction of the front fork) via the front wheel. When the front fork bends significantly due to a large lateral load, a frictional force when the spring receiver rotates increases. As a result, the frictional force when the spring rotates cannot be reduced, which may contribute to deterioration of operability of the front fork.

An object of the present invention is to provide a front fork that can improve operability as compared with that of the related art.

SUMMARY OF THE INVENTION

Solution to Problem

For example, the present inventor has found that, when a front fork in which a spring receiver made of metal and a cylinder made of metal and disposed inside the spring receiver are in direct contact with each other, as disclosed in JP-A-2009-156419, is used for a motocrosser, operability of the front fork may decrease at the time of landing after a jump. As a result of investigating the cause, the following (1) to (3) were identified. (1) When a lateral load is applied, a large lateral load is applied to a contact portion between the spring receiver and the cylinder as compared with other portions. (2) When a large lateral load is applied to the contact portion between the spring receiver and the cylinder, a frictional force when the spring receiver rotates remarkably increases. (3) When the frictional force when the spring receiver rotates is remarkably increased, rotation of the spring is hindered, and as a result, the operability of the front fork is reduced.

From the above investigation results, the present inventor considered that, in order to suppress a decrease in the operability of the front fork even when a large lateral load is applied, that is, to improve the operability of the front fork as compared with the related art, it was effective to reduce the frictional force when the spring receiver rotates as compared with the related art, and thus the present inventor examined measures to reduce the frictional force. As a result, it was found that it is effective to take measures to reduce the frictional force between an inner peripheral surface of the spring receiver and an outer peripheral surface of the cylinder, and the present invention has been completed.

Hereinafter, the present disclosure will be described.

According to an aspect of the present disclosure, there is provided a front fork including a first cylindrical body that is formed in a cylindrical shape, a second cylindrical body that surrounds an outer peripheral surface of the first cylindrical body and is provided so as to be movable in a direction of an axis with respect to the first cylindrical body, a spring that is provided between the outer peripheral surface of the first cylindrical body and an inner peripheral surface of the second cylindrical body and applies a force in a direction to separate the first cylindrical body and the second cylindrical body, and a spring seat portion that is provided on the outer peripheral surface of the first cylindrical body and receives a first end of the spring, where the spring seat portion includes, a fixing portion that is fixed to the first cylindrical body, a spring seat body that is made of metal and receives the spring, and a third cylindrical body that is disposed between an inner peripheral surface of the spring seat body and the outer peripheral surface of the first cylindrical body and reduces a frictional force when the spring seat body rotates about the axis.

According to another aspect of the present disclosure, there is provided a front fork including a first cylindrical body that is formed in a cylindrical shape, a second cylindrical body that surrounds an outer peripheral surface of the first cylindrical body and is provided so as to be movable in a direction of an axis with respect to the first cylindrical body, a spring that is provided between the outer peripheral surface of the first cylindrical body and an inner peripheral surface of the second cylindrical body and applies a force in a direction to separate the first cylindrical body and the second cylindrical body, and a spring seat portion that is provided on the outer peripheral surface of the first cylindrical body and receives a first end of the spring, where the spring seat portion includes, a fixing portion that is fixed to the first cylindrical body, a spring seat body that is made of metal and receives the spring, a third cylindrical body that is disposed between an inner peripheral surface of the spring seat body and the outer peripheral surface of the first cylindrical body and reduces a frictional force when the spring seat body rotates about the axis, and a support portion that is provided between the fixing portion and the third cylindrical body and supports the spring seat body, where the third cylindrical body and the support portion are integrally configured by one member.

Advantageous Effects of Invention

According to the present disclosure, it is possible to provide a front fork that can improve the operability.

DETAILED DESCRIPTION OF THE INVENTION

Embodiments of the present invention will be described below with reference to the accompanying drawings. In the description, left and right refer to left and right based on an occupant on a vehicle, and front and rear refer to front and rear based on a traveling direction of the vehicle. In the figure, Up is shown above and Dn is shown below. The form illustrated in the accompanying drawing is an example of the present invention and the present invention is not limited to the form.

First Embodiment

Figure 1:
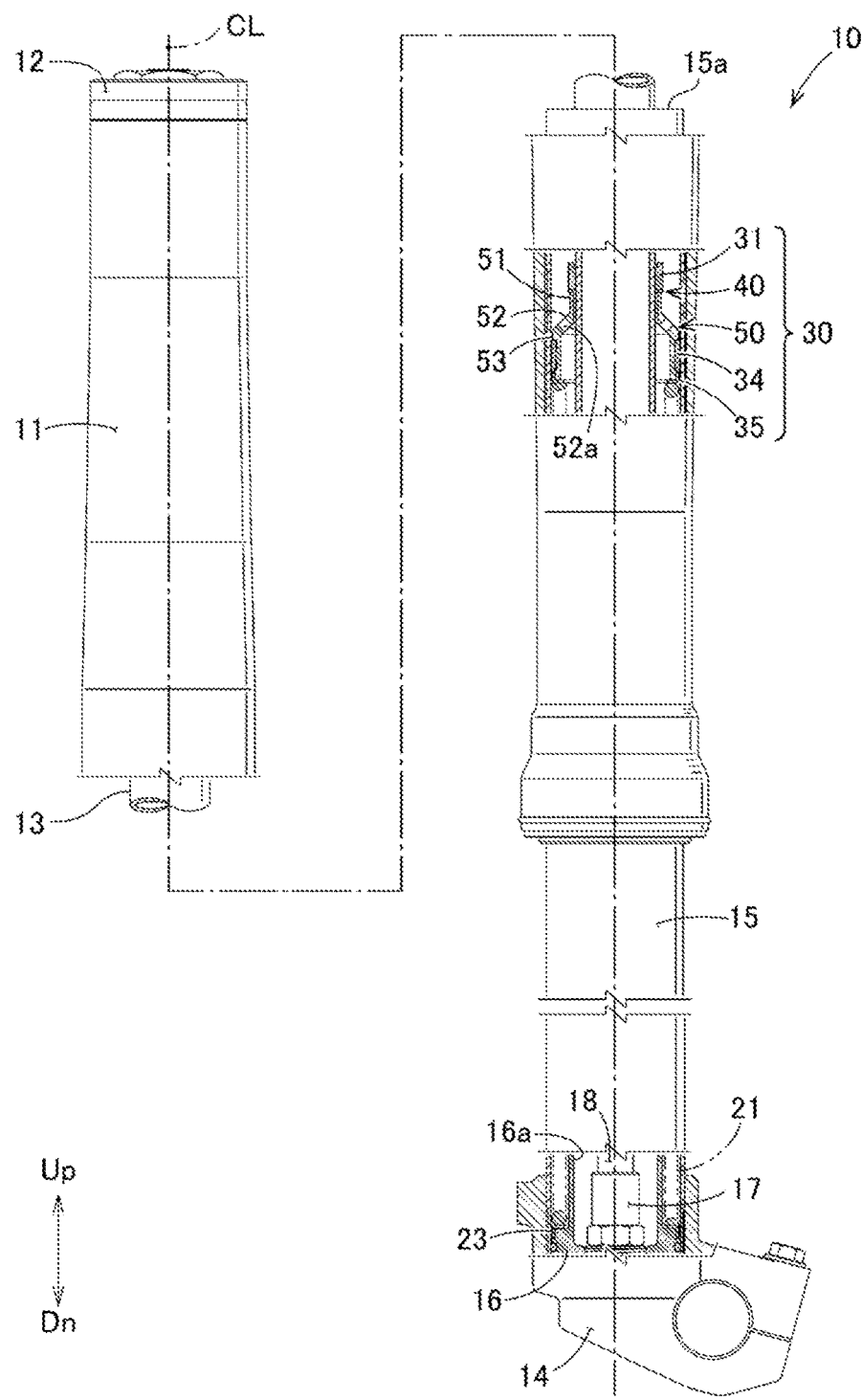
FIG. 1 is a cross-sectional view of a main part of a front fork according to a first embodiment.

See FIG. 1. A front fork 10 is an inverted-type hydraulic shock absorber provided in a saddle-ride type vehicle such as a motorcycle or a tricycle and filled with oil inside.

The front fork 10 includes, an outer tube 11 that has a cylindrical shape and is supported by a vehicle body, a closing member 12 that closes an upper end of the outer tube 11, a cylinder member 13 (first cylindrical body 13) that has a cylindrical shape, is supported by the closing member 12, and extends inside the outer tube 11, and a bracket 14 that is located at a lower end and supports an axle of a front wheel. The front fork 10 further includes an inner tube 15 (second cylindrical body 15), which is a cylindrical body extending upward from the bracket 14 and whose tip 15a exists inside the outer tube 11, and a closing member 16 which closes a lower end of the inner tube 15 and is fixed inside the bracket 14. The closing member 16 is screwed to the bracket 14 by using a bolt member 17. A rod 18, which is a cylindrical member supported by the bolt member 17, is provided with a piston (not illustrated) at a tip thereof. A spring 21 provided between an outer peripheral surface of the cylinder member 13 and an inner peripheral surface of the inner tube 15 applies a force in a direction to separate the cylinder member 13 and the inner tube 15 from each other. A spring seat portion 30 which receives an upper end (first end) of the spring 21 is provided on an outer peripheral surface of the cylinder member 13, and a lower spring seat 23 having a ring shape which receives a lower end (second end) of the spring 21 is supported by the closing member 16.

The front fork 10 is compressed so that the bracket 14 and the closing member 12 come close to each other, for example, when the front wheel rides on a step. When the front fork 10 is compressed, the oil filled inside is configured to generate a damping force. When the front fork 10 is compressed to a predetermined position, the front fork 10 is extended to return to an original position by the force of the spring 21. Even when the front fork 10 is extended, the oil filled inside is configured to generate a damping force. By generating the damping force, the oil absorbs an impact energy received when riding on a step. The front fork 10 will be described in more detail below.

Figure 2:
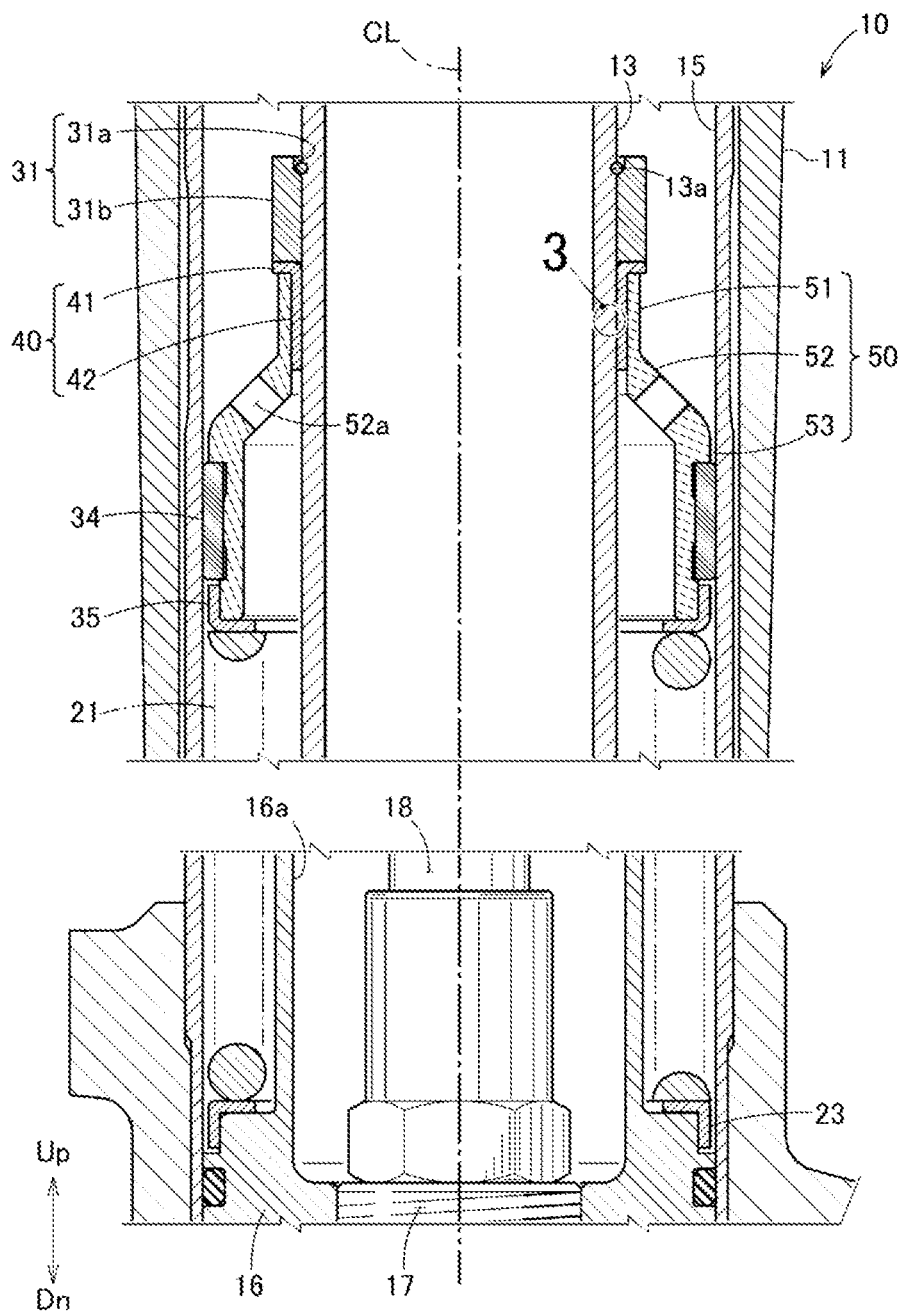
FIG. 2 is an enlarged view illustrating the main part of FIG. 1.

See FIG. 2. For example, aluminum or an aluminum alloy is adopted as the material of the cylinder member 13. The cylinder member 13 includes a recess portion 13a recessed toward an axis CL. The recess portion 13a is continuously formed in a circumferential direction of the cylinder member 13. An oil chamber filled with oil is provided inside the cylinder member 13.

The inner tube 15 is located outside the spring 21 and is disposed along an inner peripheral surface of the outer tube 11. The inner tube 15 is movable in an up-down direction relative to the outer tube 11.

The closing member 16 receives the lower end of the spring 21 via the lower spring seat 23. The closing member 16 has a guide portion 16a which extends upward inside the spring 21 and guides the spring 21.

The tip of the rod 18 is located inside the cylinder member 13. As a result, the piston provided at the tip of the rod 18 can move along the axis CL in the oil chamber located inside the cylinder member 13.

The spring seat portion 30 includes a fixing portion 31 fixed to the outer peripheral surface of the cylinder member 13, a receiving member 40 whose upper end is in contact with the fixing portion 31, and a spring seat body 50 that is made of a substantially cylindrical metal and rotatably supported around the axis CL by the receiving member 40. The spring seat portion 30 further includes a contact member 34 provided along an outer peripheral surface of the spring seat body 50 and capable of being in contact with the inner peripheral surface of the inner tube 15 and a spring receiving portion 35 which is provided at the lower end of the spring seat body 50 and is in contact with the upper end of the spring 21.

The fixing portion 31 includes a retaining ring 31a which has a ring shape (C shape), is fixed to the recess portion 13a, and has a notch in a part in the circumferential direction and a movement restricting portion 31b which is in contact with the retaining ring 31a, is restricted from moving upward, and supports the receiving member 40.

The receiving member 40 includes a support portion 41 which is a ring-shaped portion being in contact with the movement restricting portion 31b and with which an end of the spring seat body 50 is in contact and a third cylindrical body 42 which has a cylindrical shape and extends from the support portion 41 along the outer peripheral surface of the cylinder member 13 and with which the inner peripheral surface of the spring seat body 50 can be in contact.

The third cylindrical body 42 is formed by using a resin having a friction coefficient smaller than that of the spring seat body 50. Examples of such a resin include polytetrafluoroethylene (PTFE) and the like. The support portion 41 (see FIG. 2) is also configured by the same material as the third cylindrical body 42. The receiving member 40 including the support portion 41 having a flange shape and the third cylindrical body 42 extending along the axis CL in a cylindrical shape can be manufactured, for example, by a known resin molding method.

See FIG. 2. The material of the spring seat body 50 is not particularly limited as long as the material is a metal, and for example, aluminum or an aluminum alloy can be used. The spring seat body 50 includes an end portion 51 that is in contact with the outer peripheral surface of the receiving member 40 and is rotatably supported around the axis CL by the receiving member 40, a tapered portion 52 extending diagonally from the end portion 51 toward the inner tube 15, and a tip portion 53 extending from a tip of the tapered portion 52 along the inner peripheral surface of the inner tube 15. The tapered portion 52 has a plurality of holes 52a through which oil can pass.

It is also conceivable that the spring seat body 50 is configured by resin and also functions as the third cylindrical body 42. However, since the spring seat body 50 is a component that receives the spring 21, it is conceivable that a large force is received from the spring 21 in a situation such as immediately after a jumped saddle-ride type vehicle lands. From the viewpoint of making the spring seat body 50 easy to prevent damage even under such circumstances, a metal having a high toughness and a long lifespan is adopted for the spring seat body 50.

The contact member 34 is a member provided between the outer peripheral surface of the spring seat body 50 and the inner peripheral surface of the inner tube 15. Also, the contact member 34 is a member for reducing a frictional force when the spring seat body 50 moves along the axis CL or rotates about the axis CL.

The spring receiving portion 35 covers the lower surface and the outer peripheral surface of the tip portion 53 and is continuously provided in the circumferential direction of the spring seat portion 30. The spring receiving portion 35 is provided with a gap with respect to the cylinder member 13. By providing the spring receiving portion 35 with a gap with respect to the cylinder member 13, oil can pass through the gap.

The lower spring seat 23 covers the upper surface and the outer peripheral surface of the closing member 16 and is continuously provided in the circumferential direction of the closing member 16.

The front fork 10 described above is summarized below.

See FIG. 2. The front fork 10 includes the cylinder member 13 that is the first cylindrical body formed in a cylindrical shape, and the inner tube 15 that is a cylindrical body surrounding the outer peripheral surface of the cylinder member 13 and is the second cylindrical body provided so as to be movable in the direction of the axis CL with respect to the cylinder member 13. The front fork 10 further includes the spring 21 that is provided between the outer peripheral surface of the cylinder member 13 and the inner peripheral surface of the inner tube 15 and applies a force in a direction to separate the cylinder member 13 and the inner tube 15 from each other, and the spring seat portion 30 that is provided on the outer peripheral surface of the cylinder member 13 and receives the first end of the spring 21. The spring seat portion 30 includes the fixing portion 31 fixed to the cylinder member 13, the spring seat body 50 that is made of metal and receives the spring 21, and the third cylindrical body 42 that is disposed between the inner peripheral surface of the spring seat body 50 and the outer peripheral surface of the cylinder member 13 and reduces the frictional force when the spring seat body 50 rotates around the axis CL.

The spring seat portion 30 includes the third cylindrical body 42 formed of a material such as a resin having a friction coefficient smaller than that of the spring seat body 50 between the inner peripheral surface of the spring seat body 50 that is made of metal and receives the spring 21 and the outer peripheral surface of the cylinder member 13. While the saddle-ride type vehicle is running, a force in a direction of rotation about the axis CL is applied to the spring 21, so that a force in the direction of rotation is also applied to the spring seat body 50 which receives the spring 21. By providing the third cylindrical body 42, the frictional force between the spring seat body 50 and the cylinder member 13 when the spring seat body 50 rotates can be reduced. As a result, the rotation of the spring 21 is less likely to be hindered, so that the operability of the front fork can be improved as compared with the case of the related art.

The front fork 10 further includes the support portion 41 that is provided between the fixing portion 31 and the third cylindrical body 42 and rotatably supports the end of the spring seat body 50. By receiving the load in a direction parallel to the axis CL, the force in the rotation direction applied to the spring 21 can be released more easily.

In the front fork 10, the third cylindrical body 42 and the support portion 41 are integrally configured by one member. As a result, the number of components can be reduced.

Second Embodiment

Figure 3:
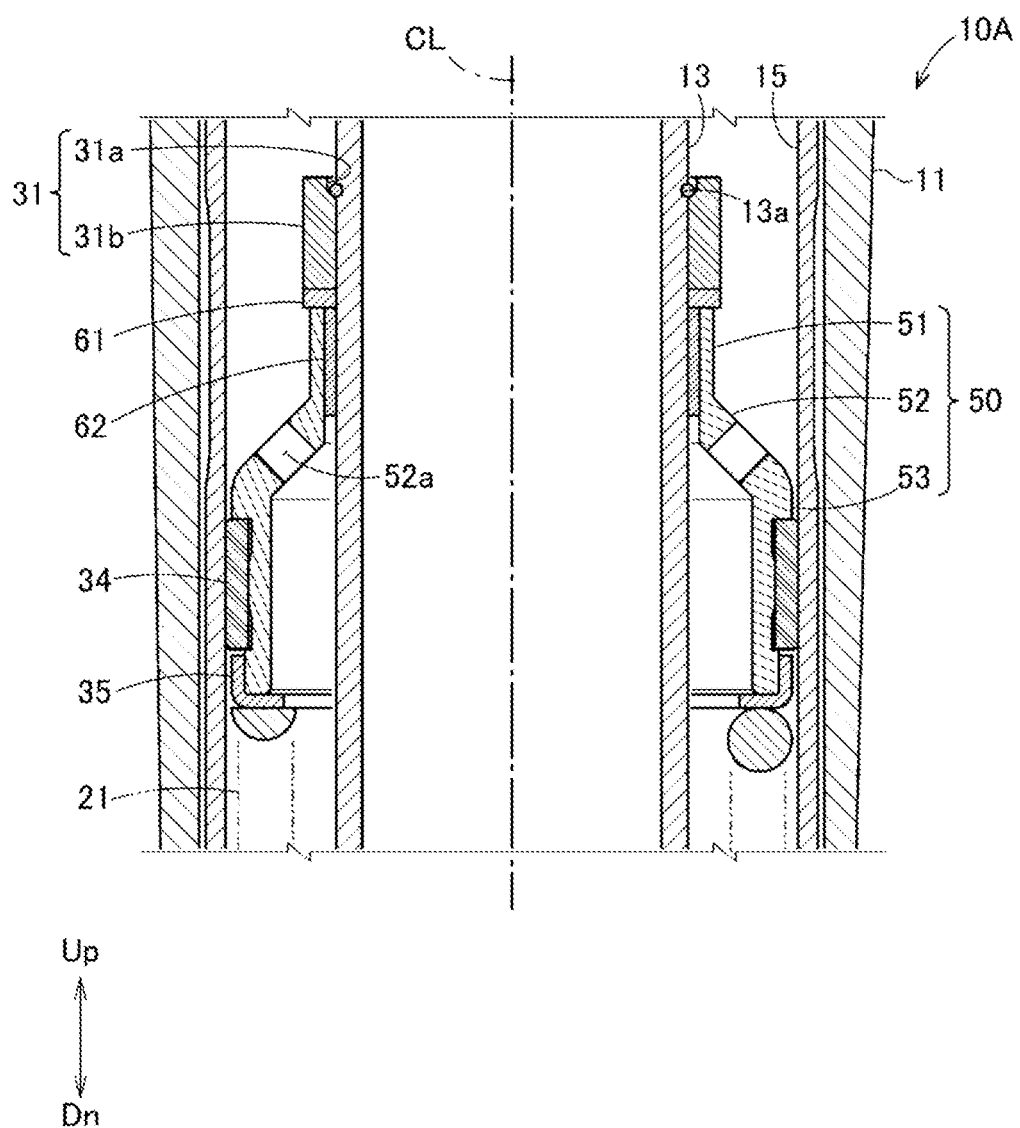
FIG. 3 is an enlarged view illustrating a main part of a front fork according to a second embodiment.

FIG. 3 illustrates a main part of a front fork 10A according to a second embodiment. In the front fork 10A according to the second embodiment, unlike the receiving member 40 used for the front fork 10 (see FIG. 2) according to the first embodiment, a third cylindrical body 62 and a support portion 61 are configured by separate members. Other basic configurations are the same as those of the front fork 10 according to the first embodiment. For the parts common to those of the first embodiment, the same reference numerals and letters are used and detailed description thereof will be omitted.

The support portion 61 supports the end of the spring seat body 50 so that the spring seat body 50 can rotate about the axis CL. The third cylindrical body 62 is provided between the inner peripheral surface of the spring seat body 50 and the outer peripheral surface of the cylinder member 13 along the inner peripheral surface of the spring seat body 50. The third cylindrical body 62 rotatably supports the spring seat body 50 around the axis CL.

The front fork 10A configured as described above also has the predetermined effects of the present invention.

In the front fork 10A, the third cylindrical body 62 and the support portion 61 are configured by separate members. By using the separate members, it becomes easy to select an appropriate material for each of the third cylindrical body 62 and the support portion 61, and to select the optimum numerical value for the dimensions such as the thickness of each. Further, by configuring the third cylindrical body 62 and the support portion 61 with separate members, it is also possible to newly design only the third cylindrical body 62 and use the support portion 61 as the related art.

Third Embodiment

Figure 4:
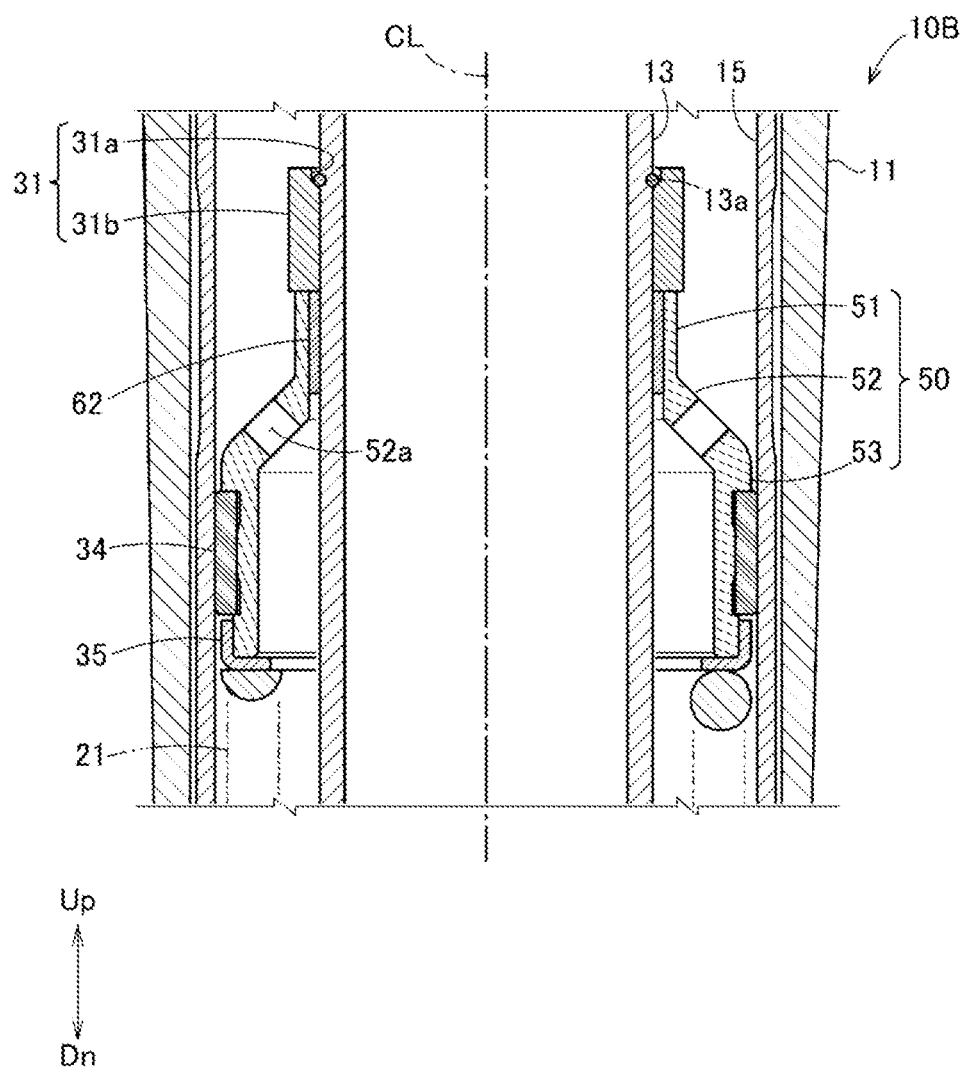
FIG. 4 is an enlarged view illustrating a main part of a front fork according to a third embodiment.

FIG. 4 illustrates a main part of a front fork 10B according to a third embodiment. In the front fork 10B according to the third embodiment, the support portion 61 used for the front fork 10A (see FIG. 3) according to the second embodiment is removed, and the third cylindrical body 62 is provided. Other basic configurations are the same as those of the front forks 10 and 10A. For the parts common to those of the front forks 10 and 10A, the same reference numerals and letters are used and detailed description thereof will be omitted.

The front fork 10B configured as described above also has the predetermined effects of the present invention.

Fourth Embodiment

Figure 5:
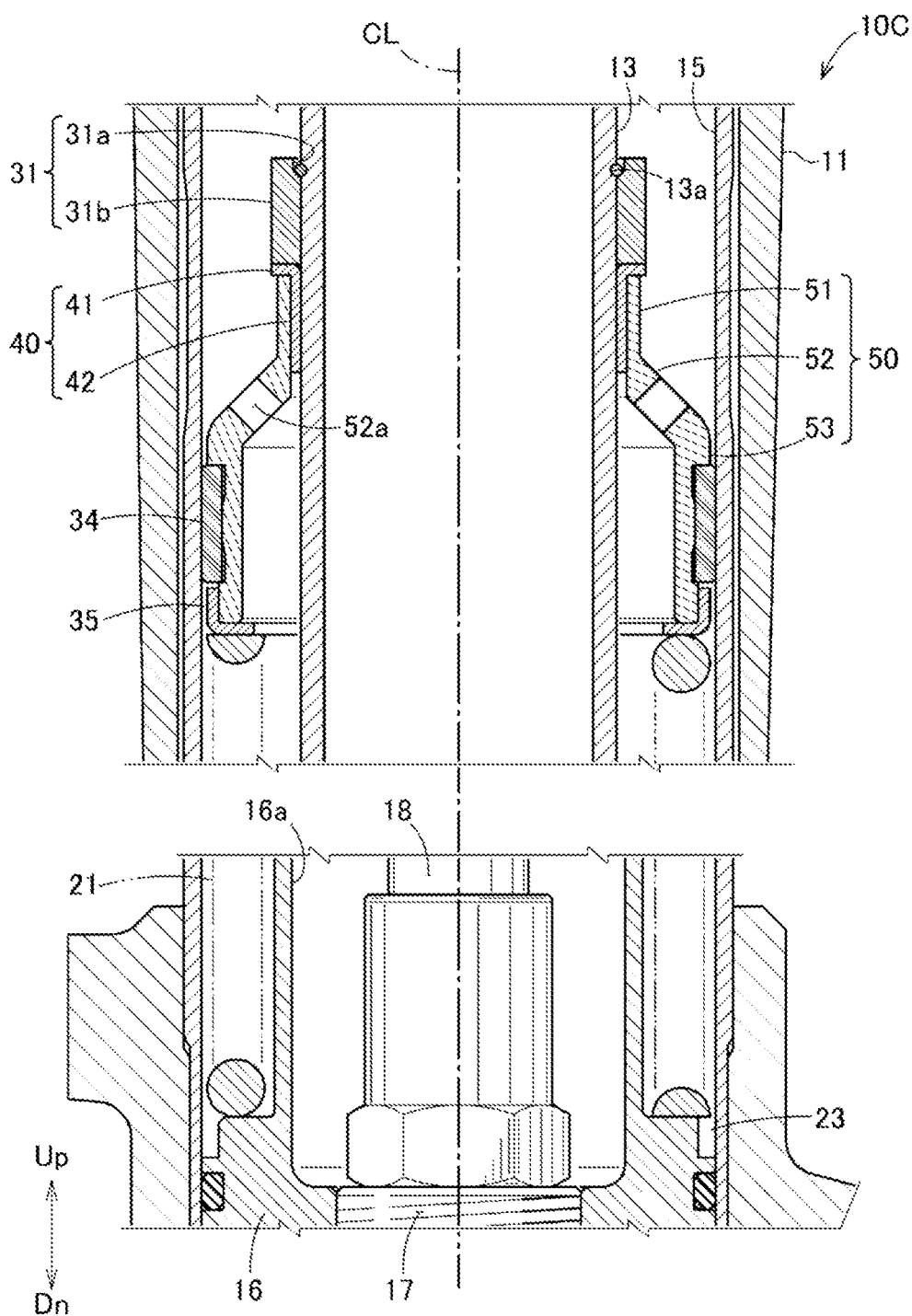
FIG. 5 is an enlarged view illustrating a main part of a front fork according to a fourth embodiment.

FIG. 5 illustrates a main part of a front fork 10C according to a fourth embodiment. In the front fork 10C according to the fourth embodiment, the lower spring seat 23 used for the front fork 10 (see FIG. 2) according to the first embodiment is removed. Other basic configurations are the same as those of the front fork 10 according to the first embodiment. For the parts common to those of the first embodiment, the same reference numerals and letters are used and detailed description thereof will be omitted.

The front fork 10C configured as described above also has the predetermined effects of the present invention.

In the front fork 10C, the lower end (the other end) of the spring 21 is in contact with the closing member 16 which closes the end of the inner tube 15. In other words, the lower end of the spring 21 is in contact with the closing member 16 directly without using the lower spring seat 23 (see FIG. 2). By using the third cylindrical body 42, the force applied in the rotation direction of the spring 21 can be smoothly released. Therefore, even when the closing member 16 having a higher friction coefficient than that of the lower spring seat 23 receives the lower end of the spring 21, the force applied in the rotation direction at the upper end can be sufficiently released.

In the above description, the embodiments in which the third cylindrical bodies 42 and 62 and the support portions 41 and 61 are made of resin are exemplified, but the present invention is not limited to these embodiments. The third cylindrical body disposed between the inner peripheral surface of the spring seat body and the outer peripheral surface of the first cylindrical body may be a rolling bearing typified by a ball bearing or a roller bearing.

In addition, each of the above embodiments can be combined as appropriate. For example, it is possible to remove the lower spring seat 23 from the front fork 10A illustrated in the second embodiment in which the support portion 61 and the third cylindrical body 62 are configured by separate members.

That is, the present invention is not limited to the embodiments as long as the operations and effects of the present invention are exhibited.

INDUSTRIAL APPLICABILITY

The front fork of the present invention is suitable for a saddle-ride type vehicle.

REFERENCE SIGNS LIST 10, 10A, 10B, 10C: front fork
13: cylinder member (first cylindrical body)
15: inner tube (second cylindrical body)
16: closing member
21: spring
30: spring seat portion
31: fixing portion
41, 61: support portion
42, 62: third cylindrical body
50: spring seat body
CL: axis

The invention claimed is:

1. A front fork, comprising:
a first cylindrical body that is formed in a cylindrical shape;
a second cylindrical body that surrounds an outer peripheral surface of the first cylindrical body and is provided so as to be movable in a direction of an axis with respect to the first cylindrical body;
a spring that is provided between the outer peripheral surface of the first cylindrical body and an inner peripheral surface of the second cylindrical body and applies a force in a direction to separate the first cylindrical body and the second cylindrical body; and
a spring seat portion that is provided on the outer peripheral surface of the first cylindrical body and receives a first end of the spring, wherein
the spring seat portion includes;
a fixing portion that is fixed to the first cylindrical body;
a receiving member whose upper end surface abuts the fixing portion; and
a spring seat body that is made of metal, receives the spring and is rotatably supported around the axis by the receiving member,
the receiving member includes:
a third cylindrical body that is disposed between an inner peripheral surface of the spring seat body and the outer peripheral surface of the first cylindrical body and reduces a frictional force when the spring seat body rotates about the axis; and
a support portion that is provided between the fixing portion and the third cylindrical body and supports the spring seat body,
the third cylindrical body and the support portion are integrally configured as one member, and
the third cylindrical body and the support portion are formed of a material having a friction coefficient smaller than that of the spring seat body.

2. The front fork according to claim 1, wherein a second end of the spring, which is an end opposite to the first end, is in contact with the closing member which closes an end of the second cylindrical body.

* * * * *